United States Patent [19]

Lambert

[11] Patent Number: 5,083,246

[45] Date of Patent: Jan. 21, 1992

[54] HELMET MOUNTED AVIATION NIGHT VISION ILLUMINATING DEVICE

[76] Inventor: Jesse A. Lambert, 17 S. Nancy St., Daleville, Ala. 36322

[21] Appl. No.: 624,004

[22] Filed: Dec. 7, 1990

[51] Int. Cl.$^5$ ............................................ B64D 47/02
[52] U.S. Cl. ...................................... 362/62; 362/105
[58] Field of Search ................. 362/62, 105, 293, 106, 362/458; 244/222

[56] References Cited

U.S. PATENT DOCUMENTS 4,580,196  4/1986  Task ...................................... 362/62
4,779,942  10/1988  Verney ................................. 350/1.1

*Primary Examiner*—Ira S. Lazarus
*Assistant Examiner*—Richard R. Cole
*Attorney, Agent, or Firm*—Caesar, Rivise, Bernstein, Cohen & Pokotilow

[57] ABSTRACT

Apparatus for illuminating a portion of the cockpit of an aircraft utilizing a night vision imaging system. The apparatus comprising an illumination unit comprising light emitting diodes for selectively producing a wide angle flood beam of light or a narrow angle spot beam of light, neither of which will adversely affect the operation of the night vision imaging system. The illumination unit is releasably mounted on the microphone mounted on the pilot's helmet so that it is adjacent the pilot's mouth. The illumination unit includes a depressible switch arranged to be operated by the pilot's lip or tongue to cause the unit to produce the light beam. A first mode control switch is mounted on the illumination unit to disable the depressible switch while causing the illumination unit to produce the light beam. A second mode control switch is also mounted on the illumination unit for selecting either the flood beam or spot beam. The illumination unit is provided with electrical power from a battery mounted within a housing releasably secured to the pilot's helmet.

20 Claims, 1 Drawing Sheet

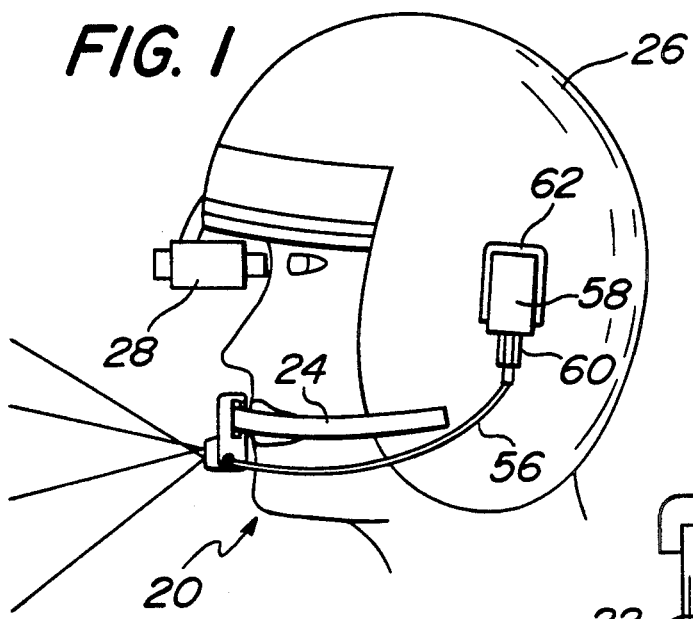
FIG. 1
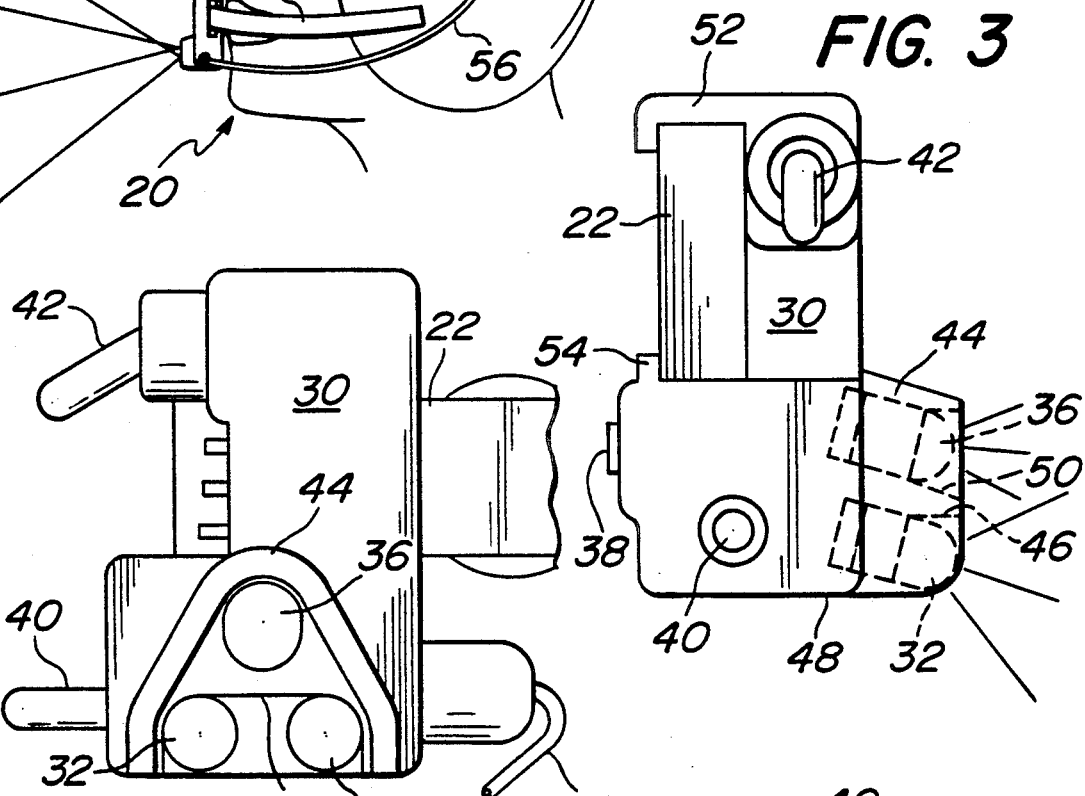
FIG. 3
FIG. 2
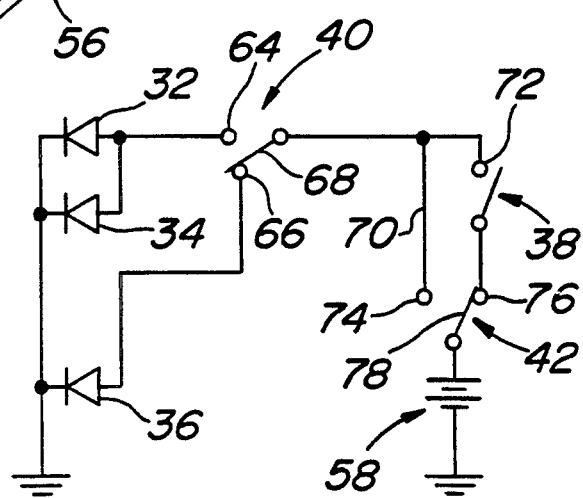
FIG. 4

HELMET MOUNTED AVIATION NIGHT VISION ILLUMINATING DEVICE

BACKGROUND OF THE INVENTION

The invention relates generally to an illuminating device for use by aviators and particularly to an aviation night vision illuminating device for use in combination with an aviator's night vision imaging system.

There are presently on the market aviator's night vision imaging systems which enable pilots to fly helicopters, for example, close to the ground even in the darkest of night conditions without illumination. However, in order to be able to use the aviators night vision imaging systems available, it is necessary for the pilots to turn off the illuminating means for the various gauges used in the cockpit of the helicopter or plane. The illuminating devices in the cockpit are so bright that the night vision goggles would be blown out or otherwise adversely affected or compromised by the overloading of the illumination from the gauges. That is, the illumination from the gauges when taken in directly by the goggles overloads the light amplification circuitry in the goggles and thereby turns off the goggles.

Accordingly, an important problem of a helicopter pilot when flying close to the ground at night and using a night vision imagining system is that the various gauges that must be monitored during flight cannot be seen in the dark. Also, even if the goggles are turned off or taken off, it is still imperative that the illumination of the gauges does not enable the helicopter to be seen at night from outside the cockpit when the aircraft is being used clandestinely.

OBJECTS OF THE INVENTION

It is therefore a general object of this invention to provide a night vision illuminating device which overcomes the disadvantages of the prior art.

It is a further object of this invention to provide an illuminating device which can be used in conjunction with an aviators night vision imaging system which illuminates the gauges in a cockpit without adversely affecting the airplane's night vision system.

It is still a further object of this invention to provide an illuminating device which is of a sufficiently high intensity to enable the pilot to see items in the cockpit, yet is not of such high intensity wherein it may adversely affect the airplane's night vision system or be seen from outside the cockpit.

It is yet a further object of this invention to provide an illuminating device which is arranged to be mounted on the helmet mounted microphone of the pilot for ready access and operation.

It is yet another object of this invention to provide an illuminating device which is arranged to be mounted on the helmet mounted microphone of the pilot for actuation by the pilot's lip or tongue.

SUMMARY OF THE INVENTION

These and other objects of the instant invention are achieved by providing apparatus for illuminating a portion of the cockpit of an aircraft utilizing a night vision imaging system. The apparatus comprises illumination means, e.g., an LED unit, worn by the pilot of the aircraft for producing a light beam which is sufficiently high so that an object located within the beam may be readily distinguished by the pilot, yet is sufficiently low that it will not adversely affect the operation of the night vision imaging system. The unit includes first manually actuatable means arranged to be actuated by a lip or the tongue of the pilot for causing the illumination means to produce the light beam.

In accordance with one preferred aspect of this invention the apparatus additionally comprises first selector means arranged to be manually operated by the pilot for causing the illumination means to produce either a flood beam of light or a spot beam of light, with the flood beam being substantially broader and less intense than the spot beam.

In accordance with another preferred aspect of this invention, the apparatus additionally comprises second selector means arranged to be manually operated by said pilot for disabling the first manually actuatable means while causing said illumination means to produce the desired beam of light continuously.

DESCRIPTION OF THE DRAWINGS

These and other objects and many of the attendant advantages of this invention will be readily appreciated as the same becomes better understood by reference to the following detailed description when considered in connection with the accompanying drawings wherein:

FIG. 1 is a side elevational view of the device of this invention shown mounted on a conventional microphone attached to conventional aviation head gear;

FIG. 2 is an enlarged front elevational view of a portion of the device shown in FIG. 1;

FIG. 3 is a side elevational view of the device shown in FIG. 2; and

FIG. 4 is a schematic diagram of the electrical circuitry of the device shown in FIG. 2.

DETAILED DESCRIPTION OF THE PREFERRED EMBODIMENT

Referring now in detail to the various figures of the drawing wherein like reference characters refer to like parts, there is shown at 20 in FIG. 1 a aviation night vision illuminating device constructed in accordance with the subject invention.

The illuminating device 20 is mounted on a microphone 22 which is pivotally connected to an arcuate elongated inflexible strap or clamp 24 which is mounted on the side of helmet 26 of a pilot.

As seen in FIG. 1, also connected pivotally to the helmet 26 is an aviator's night vision imaging system 28 which amplifies light. It is preferably of the type which uses Gallium Arsenide technology for advanced sensitivity under the very lowest of light level conditions.

The goggles of the aviator's night vision imaging system 28 are used by the aviator to enable flying in the darkest of conditions.

The illuminating device 20 of the invention is specifically adapted for use with an aviator's night vision imaging system to enable the pilot to be able to look through goggles 28 or directly with eyes only to be able to read the gauges in a cockpit where the normal lights for the gauges are turned off.

The illuminating device which is best seen in FIGS. 2 and 3 basically comprises a housing 30 having mounted therein at the light emitting diodes 32, 34 and 36, a depressible switch 38, a toggle switch 40 and a toggle switch 42.

The bottom portion of the housing 30 is generally rectangular and mounted in the rear thereof is the depressible switch 38 which is closed by depressing the outer surface of the switch 38 by use of either the lip or tongue of a pilot. Mounted on the left side of the housing, as seen in FIG. 2, is switch 40 which is also mounted in the lower rectangular portion of the housing 30. In the forward side of the bottom of the housing is a boss or extended portion 44 in which a first laterally extended opening or cavity 46 is provided in which the LEDs 32 and 34 are mounted and disposed. As best seen in FIG. 3, the LEDs 32 and 34 are essentially aimed at an angle 15° below the surface 48 forming the bottom of the housing 30. A cylindrical opening 50, symmetrically aligned with and above cavity 46 is provided in which LED 36 is disposed. The LED 36 is also disposed at an angle of 15° with respect to the surface 48 of the housing so that the field of view from the illumination of the LEDs is disposed downwardly of the pilot's eyes to facilitate looking at the gauges in the cockpit. As best seen in FIG. 2, the extended portion 44 of housing 3 surrounds the LEDs 32, 34 and 36 to prevent a direct sighting except from in front of the pilot. This further prevents the LEDs from being seen from outside the cockpit or causing a problem to the night vision goggles.

The upper portion of housing 30 is of a narrower rectangular portion and is integral with the lower portion and includes an L shaped flange 52. The rectangular upper portion of housing 30 includes therein a manually actuatable toggle switch 42. The L shaped flange 52 in combination with a rib 54 form a rectangular cavity for mounting the housing 30 upon the microphone 22 as best seen in FIGS. 2 and 3. The dimension of the opening in housing 30 is only slightly larger than the outside dimensions of the microphone so that the housing is secured to the microphone by a press fit.

The lamps 32, 34 and 36 are electrically connected via the switch means 38, 40 and 42 via a shielded cable 56 to a battery pack 58 via a suitable connector 60.

The battery pack 58 preferably comprises a case containing two AA batteries which are connected in serial to provide 3 volts. The back of the battery pack has a hook fastener so that the battery pack can be supported by helmet 26 on a loop fastener patch 62 which is preferably adhesively secured to the outside rear surface of helmet 26. The hook and loop fastening system is preferably of the type sold under the mark VELCRO which is commercially available.

The light emitting diodes 32 and 34 produce a light frequency in the green range which is in the range of frequencies of 562 nanometers to 567 nanometers. The light intensity produced by the LEDs 32 and 34 is preferably 6.3 mcd. The LEDs 32 and 34 are preferably T 1¾ which have a diffused envelope which causes a beam dispersion of approximately 75° for each of the LEDs. The LEDs are aligned vertically and are disposed horizontally at an angle with respect to each other to enable a broad field of view laterally of approximately 150° and a top to bottom field view of approximately 75°. This flood lamp comprised of LEDs 32 and 34 is preferably used when there is substantially no external illumination such as when there is no moon illumination and therefore the pilot's eyes are extremely sensitive.

The LED 36 however, has a clear or tinted envelope which also produces green light in the range of 562 to 567 nanometers but which has an intensity of 160 mcd and a beam which disburses only 24°. This lamp 36 provides the intensity needed when there is a full moon and the pilot's eyes are not as sensitive to light. Also, the lower illumination and wider dispersion of light of lamps 32 and 34 is useful for finding specific gauges and then the lamp 36 is illuminated for the purpose of reading the gauge.

Switch 40 is electrically connected so that it enables switching between the use of flood lamp LEDs 32 and 34 and the spot lamp LED 36. As best seen in FIG. 4, lamps 32, 34 and 36 are connected to each other at one end and then to ground. LEDs 32 and 34 are connected together at their other end and to the contact 64 of switch 40. Switch 40 includes a second contact 66 and an arm 68. The contact 66 is connected to the second end of LED 36 with the first side of diode 36 being connected to ground. Thus, switch 40 enables energization of either the pair of lamps 32 and 34 which act as a flood lamp or lamp 36 which acts as a spot beam.

The arm 68 of switch 40 is connected to wire 70 and to contact 72 of switch 38. Switch 38 is normally opened except when depressed by pressure on the switch by either the pilot's lip or tongue. Wire 70 is connected to contact 74 of switch 42. Switch 42 also includes a contact 76 and a movable arm 78 which is actuatable to be moved against contact 74 or contact 76. Thus, switch 42 is a mode switch which enables either continuous operation of the illumination means or manually actuatable operation by the lip or tongue of the pilot. When arm 78 is in contact with contact 74, there is constant illumination of either lamps 32 and 34 or lamp 36. When arm 78 touches contact 76, the illumination is only by depression of the switch 38 which causes connection of the arm to contact 72. The arm 78 of switch 42 is connected to the positive side of batteries 58 and the negative side of the batteries are connected to the ground.

It can therefore be seen that when the pilot desires lower level wide range of illumination, switch 40 is moved so that arm 68 makes contact with contact 64 thereby causing LEDs 32 and 34 to be across the 3 volt battery source 58. When the pilot desires a higher intensity narrower focus of illumination, lamp 36 is illuminated by switching arm 68 of switch 40 to contact 66 thereby causing only LED 36 to be placed across the voltage source 58.

It should also be noted that with the lower illumination of the flood lamps 32 and 34, there is very little glare and the pilot's night vision is not affected even in the lowest of light conditions. Where there is a full moon, it is often necessary to use only the spot light to enable reading the gauges in the cockpit.

Whether the lamps 32 and 34 are being used as a flood lamp or LED 36 is being used a spot lamp, the frequency range of the light which is from 562 to 567 nanometers effectively prevents the lamp from being seen outside the cockpit. Also, the intensity of LED 36 is limited to 160 mcd which thereby prevents even lamp 36 from being seen outside of the cockpit.

It can also be seen that by providing a housing which fits over a microphone, the device can be easily installed on the helmet of the pilot and facilitates use of the gauges even while flying in the strictest of secrecy in night conditions.

Without further elaboration, the foregoing will so fully illustrate my invention that others may, by applying current or future knowledge, readily adapt the same for use under various conditions of service.

I claim:

1. Apparatus for illuminating a portion of a cockpit of an aircraft utilizing a night vision imaging system, said apparatus comprising illumination means worn by a pilot of said aircraft for producing a field of illumination which is sufficiently high so that an object located within the field of said illumination may be readily distinguished by said pilot, yet is sufficiently low that it will not adversely affect operation of said night vision imaging system, and manually actuatable means arranged to be actuated by a lip or tongue of the pilot for causing said illumination.

2. The apparatus of claim 1 wherein a portion of said apparatus is arranged to be releasably mounted on a microphone supported by a helmet worn by the pilot.

3. The apparatus of claim 2 wherein said illumination means is provided electrical power from a self-contained power source, said power source being releasably mounted on said helmet.

4. The apparatus of claim 3 wherein said self contained power source includes a housing, said housing being releasably secured to said helmet by a hook and loop fastening system.

5. The apparatus of claim 4 wherein said self contained power source comprises a low voltage battery.

6. The apparatus of claim 5 wherein said battery source provides 3 volts.

7. The apparatus of claim 1 wherein said apparatus additionally comprises first selector means arranged to be manually operated by said pilot for causing said illumination means to produce either a flood beam of light or a spot beam of light, said flood beam being substantially broader than said spot beam.

8. The apparatus of claim 7 wherein said apparatus additionally, comprises second selector means arranged to be manually operated by said pilot for disabling said first named manually actuatable means while causing said illumination means to produce said beam of light continuously.

9. The apparatus of claim 7 wherein said illumination means produces light of an intensity in the range of 6.3 mcd to 160 mcd.

10. The apparatus of claim 7 wherein said illumination means comprises at least one LED for producing said flood beam and another LED for producing said spot beam.

11. The apparatus of claim 10 wherein the LEDs forming the flood beam and the spot beam produce light of a frequency in the range of 562 nanometers to 567 nanometers.

12. The apparatus of claim 10 wherein said flood beam produces light of an intensity of approximately 6.3 mcd.

13. The apparatus of claim 10 wherein the spot beam produces light of an intensity of approximately 160 mcd and the flood beam produces light of an intensity of approximately 6.3 mcd.

14. The apparatus of claim 1 wherein said apparatus additionally comprises second selector means arranged to be manually operated by said pilot for disabling said first named manually actuatable means while causing said illumination means to produce said beam of light continuously.

15. The apparatus of claim 1 wherein said illumination means comprises at least one LED.

16. The apparatus of claim 15 wherein said LED produces light of a frequency in the range of 562 nanometers to 567 nanometers.

17. The apparatus of claim 16 wherein said illumination means produces light of an intensity in the range of 6.3 mcd to 160 mcd.

18. The apparatus of claim 1 wherein said illumination means is provided electrical power from a self contained power source.

19. The apparatus of claim 18 wherein said self contained power source comprises a low voltage battery.

20. The apparatus of claim 19 wherein said battery source provides 3 volts.

* * * * *